United States Patent [19]

Schardt

[11] 4,345,795
[45] Aug. 24, 1982

[54] WIRE WHEEL WITH DISC BRAKE CLEARANCE

[75] Inventor: James J. Schardt, Dayton, Ohio

[73] Assignee: Dayton Wheel Products Company, Dayton, Ohio

[21] Appl. No.: 172,311

[22] Filed: Jul. 25, 1980

Related U.S. Application Data

[63] Continuation of Ser. No. 947,033, Sep. 29, 1978, abandoned.

[51] Int. Cl.³ .............................................. B60B 1/04
[52] U.S. Cl. ...................................... 301/6 E; 301/8; 301/59
[58] Field of Search ................... 301/6 R, 6 E, 105 R, 301/8, 55–59, 67–69, 73–75, 79–81; 29/159.02, 159.03, 159.3; 188/18 A, 71.1, 218 XL, 264 A

[56] References Cited

U.S. PATENT DOCUMENTS

| 1,338,410 | 4/1920 | Williams | 301/59 |
|---|---|---|---|
| 1,474,631 | 11/1923 | House, Jr. | 301/55 |
| 1,911,049 | 5/1933 | Ash | 301/6 R X |
| 2,734,778 | 2/1956 | Cook | 301/8 |
| 2,754,936 | 7/1956 | Butler | 188/264 A X |
| 4,019,782 | 4/1977 | Reppert | 301/58 |

FOREIGN PATENT DOCUMENTS

| 655669 | 12/1928 | France | 301/55 |
|---|---|---|---|
| 399256 | 10/1933 | United Kingdom | 29/159.02 |

Primary Examiner—Charles A. Marmor
Attorney, Agent, or Firm—Biebel, French & Nauman

[57] ABSTRACT

A wire wheel for fitting to a vehicle having a brake disc and a brake caliper extending around a portion of the edge of the disc, comprising a circular rim (10), a hubshell (15) having an inner mounting end and a smaller outer end and having an outer diameter somewhat smaller than normal, its radius being less than the radial spacing of brake caliper from the wheel center, and a plurality of spokes (12) connected between the rim and the hubshell supporting the rim concentric with the hubshell and with the hubshell located predominantly on the outer side of a plane which bisects the rim circumferentially. A supporting ring (2) is rigidly fitted to the inner mounting end of the hubshell, preferably with an interference fit and has a mounting face adjacent or coincident with the plane such that the caliper is clear of rotating spokes.

2 Claims, 2 Drawing Figures

WIRE WHEEL WITH DISC BRAKE CLEARANCE

This is a continuation of application Ser. No. 947,033 filed Sept. 29, 1978 now abandoned.

BACKGROUND OF THE INVENTION

This invention relates to wire wheels for vehicles. Such wheels are still in demand by many persons for reasons of appearance, and also because the suspension of the rim, via the spokes from the hubshell of the wheel provides an advantage in the ride of the vehicle. The traditional general structure of wire wheels embodies a machined hubshell which is adapted to be fastened to the wheel hub of the vehicle, either through bolts or a so caled "knock-off" hub, and a plurality of spokes which extend outwardly from the hubshell through holes in a surrounding wheel rim. The outer ends of the spokes are threaded into nipples which extend inwardly through the holes in the rim. The spikes do not extend in a truly radial direction from the hubshell, but extend outward and/or inward so that there are spokes extending from two laterally displaced circles of holes in the hubshell into two laterally displaced circles of nipples on the rim. This arrangement is necessary in order to accommodate lateral forces due to cornering and other maneuvering of the vehicle. In the use of such wheels, however, the lateral space occupied by the spokes may present somewhat of a clearance problem when the wheels are to be used on vehicles having disc brakes, since a typical prior art hubshell has an outer diameter which will interfer with the brake caliper housing.

As is well known, the disc brake includes a rotor disc which is carried by the wheel hub, and a caliper which surrounds a portion of the periphery of the disc rotor, the caliper carrying the brake pads which press against the rotor to produce the desired braking action. The housing of the caliper extends outward somewhat from the surface of the rotor, into the region generally radically outward from the end of the wheel hub, and in many installations involving disc brakes, the caliper housing presents a clearance problem with respect to a larger size hubshell and/or to the spokes of wire wheels which pass fairly close to the central plane of the wheel, that is, the plane which bisects the wheel rim circumferentially. It is desirable, therefore, to reduce the size of the hubshell and to displace the spokes with respect to the caliper by offsetting the rim sufficiently so that there is adequate clearance for the rotating spokes, but without adversely affecting the structural integrity of the hubshell and the entire wire wheel.

SUMMARY OF THE INVENTION

The invention, therefore, provides in such a wire wheel a supporting ring which is rigidly fitted to the interfacing cup-like portion of a hubshell which is somewhat smaller in diameter than normal. Preferably the supporting ring is arranged with an interference fit, and is either pressed into place with substantial mechanical pressure, or, alternatively, fitted by the technique of differential heating, where either the hubshell is caused to expand by heating, or the ring is caused to shrink slightly by cooling, sufficient to provide temporary clearance as the parts are fitted together, but such that when the parts reach the same temperature, the interference fit holds the supporting ring rigidly fitted into the hubshell, essentially as if it were an integral part of the hubshell. The supporting ring, however, can be removed in like manner if it is necessary to repair and/or recondition the wheel. This is necessary because the supporting ring in place covers some of the inner ends of the spokes fitted through the hubwheel, and these must be uncovered for rapair and/or replacement.

Therefore, the principal object of this invention is to provide a unique wire wheel construction, particularly for fitting to a vehicle having disc brakes, wherein a supporting ring is rigidly fitted to the hubshell, and in turn receives the mounting bolts of the wheel hub, such that the spokes of the wheel are supported sufficiently outward from the brake caliper housing, the hubshell thus having a smaller diameter than the brake caliper location and being located predominately on the outer side of the plane which bisects the rim circumferentially; to provide such a wire wheel construction wherein the supporting ring is fitted with an interference fit to the hubshell and to provide a method of constructing a wire wheel wherein such a supporting ring is rigidly fitted into the hubshell for the desired purpose, but is removable when necessary for repair or maintenance of wheel.

Other objects and advantages of the invention will be apparent from the following description, the accompanying drawings and the appended claims.

DESCRIPTION OF THE PREFERRED EMBODIMENT

Figure 1:
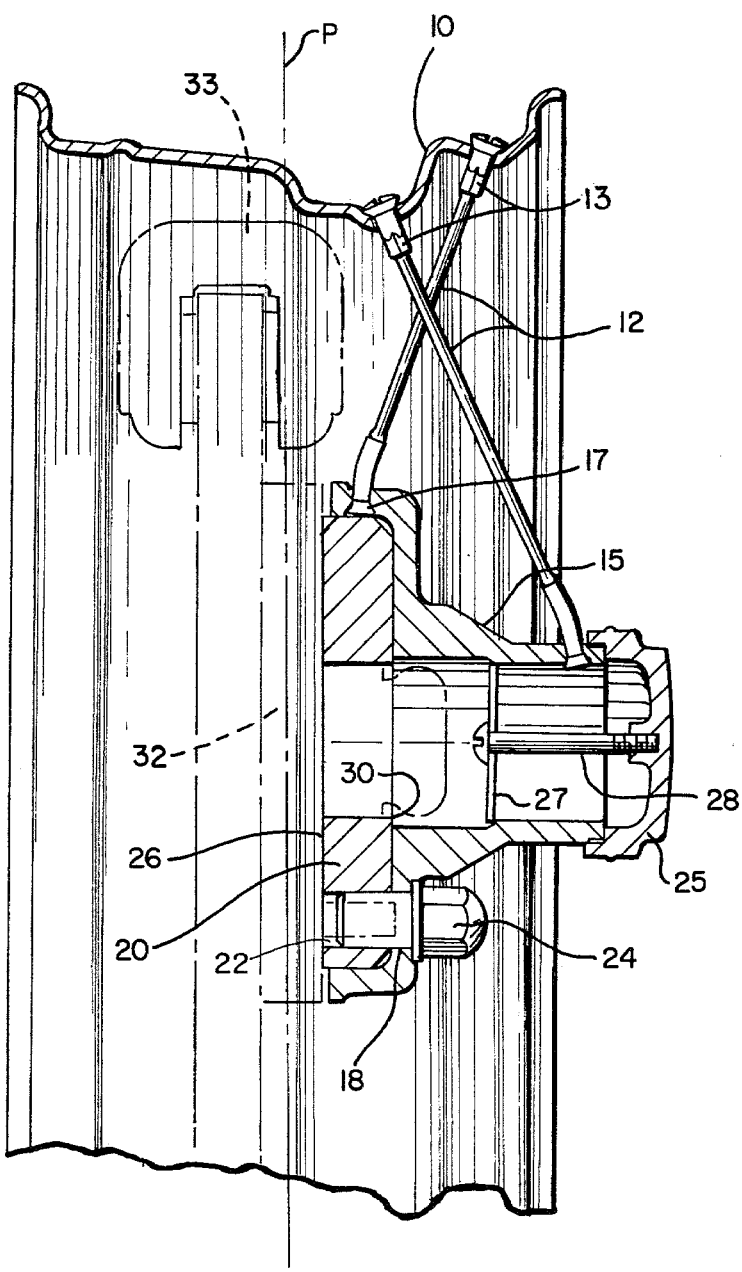
FIG. 1 is a partially broken away vertical sectional view taken through the wire wheel provided by the invention, with the wheel hub and the rotor disc and caliber assembly of a disc brake shown in phantom lines.

The tire 10 rim is a commercially available steel or aluminum rim which is pierced or drilled in a conventional manner for wire spoked wheels. The spokes 12 and nipples 13 are conventional and commercially available.

The hubshell 15 is machined to the desired shape from a casting, forging, stamping, or other fabricated material, and may be polished and electroplated if desired. After machining, holes 17 to receive spokes are drilled in the proper pattern these holes being about 0.020 inch larger than the spoke diameter, and being internally chamfered as shown. The bolt pattern holes 18 are also drilled; outer diameter is less than the normal size prior art hubshell.

Figure 2:
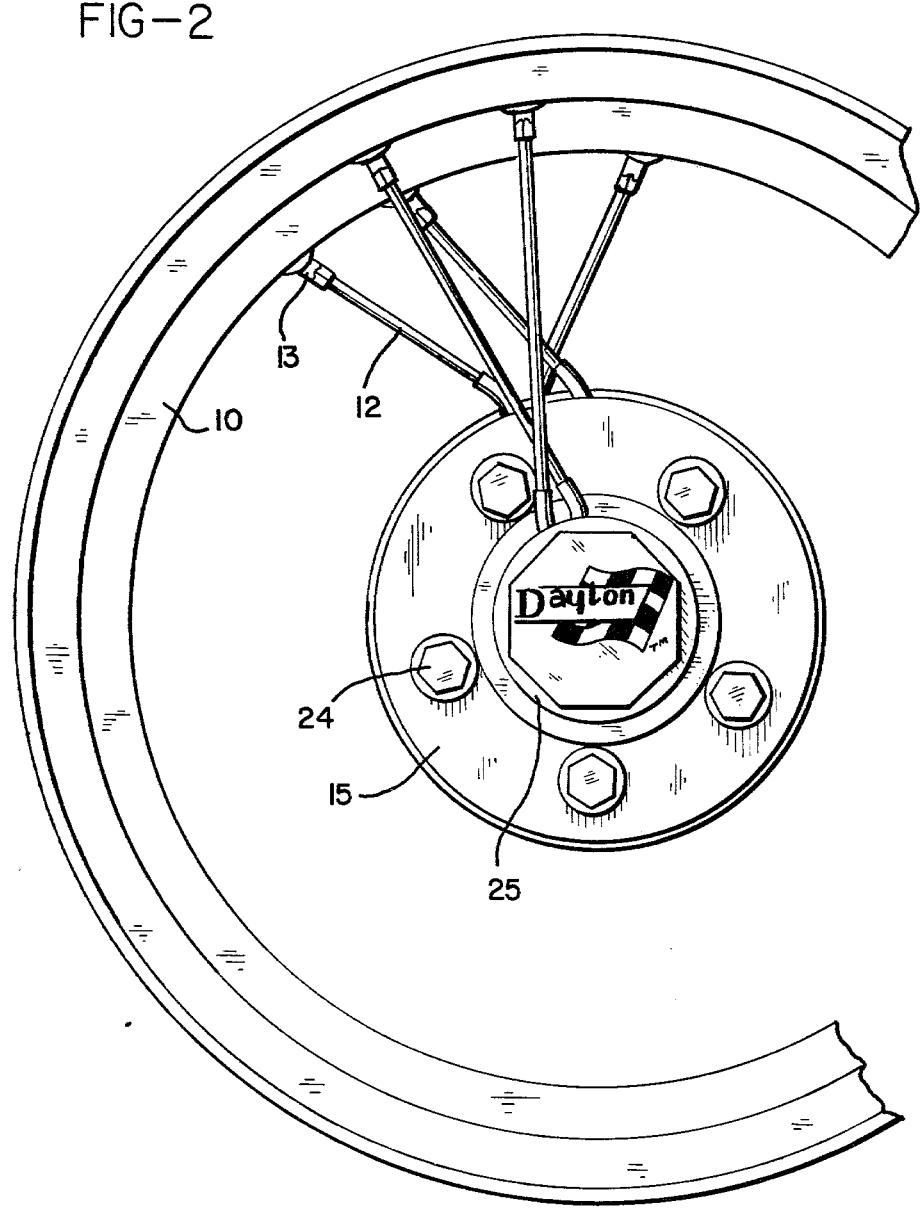
FIG. 2 is a partial front elevational view of the wheel, with only a few of the spikes illustrated in order to simplify the drawing.

The hub support ring 20 is machined to proper size usually from an aluminum casting, although other materials would be satisfactory. The decorative cap 25 can be made from a stamping or casting and may contain a decorative label or the like in its outer face as shown in FIG. 2. The cap 20 is held in place by a washer 27 and retaining screw 28.

After the parts are machined, and electroplated if desired, the wheel is assembled. The spokes are inserted through the hubshell, the nipples are inserted through the rim and threaded onto the spoke ends. The number of spokes is not important and may vary according to design, usually between forty and ninety-six.

After all spokes and nipples are installed, the rim and hubshell are held concentric in a fixture while the nipples are threaded snug onto the spokes. The assembly is then transferred to an alignment fixture where the nipples are hand tightened with a wrench to approximately sixty-five inch-pounds torque, while maintaining both lateral and radial runout of less than 0.030 inch.

The hub support ring 20 is then installed either by using a 0.001" to 0.002" interference press fit in conjunction with an adhesive, or achieving the interference fit by creating a temperature differential of about 100° F. between the support and the hubshell, by heating the hubshell (or cooling support) and then inserting the support into the hubshell and allowing it to equilibrate and become an interference fit. At this point the support ring becomes essentially an integral part of the hubshell. However, it can be removed if required, by pressing on the support at point 30 with about 1000 pounds force, or by differential heating together with pressing.

Other mechanical or chemical type fits could be utilized such as screws, bolts, and, adhesives, or combination thereof. It is possible to install the ring 20 without an interference fit, and hold it in position by mechanical or adhesive methods. This would permit the hub to clear disc brake calipers, but does not give as desirable a structural support to the hubshell as is achieved with an interference fit.

As will be noted from FIG. 1, the ring 20 substantially fills the cup shaped interior of the inner larger end of the hubshell 15, this end being the mounting end for the wheel. The ring covers the interior ends of the spokes, bolt holes 22 in the ring align with the bolt holes 18 in the hubshell, and the wheel retaining nuts 24 extend into these holes as shown.

The inner or mounting face 26 of the ring, provides the accurate facing which engages the wheel hub 32, and the wheel is supported with the hubshell located outward (to the right in FIG. 1) of the plane P which bisects the rim 10, in a circumferential direction, and extends through the wheel mounting end of the hub 32. It will be seen that this locates the spokes 12 outward of the brake caliper housing 33. The outer diameter of the hubshell is about 25% less than the diameter of a typical prior art hubshell, and its radius is less than the radial spacing of the innermost edge of the caliper housing 33, as seen in FIG. 1.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. In a wire wheel particularly for fitting to a vehicle having a brake disc and a brake caliper extending around a portion of the edge of the disc,
    a circular rim having holes therethrough for receiving spoke nipples,
    a hubshell having an inner mounting end with a cup-shaped interior and being less in radius than the spacing of the caliper from the wheel center and also having a smaller outer end,
    said inner mounting end having radially extending holes adapted to receive spokes
    a plurality of spokes extending between said rim and said hubshell supporting said rim concentric with said hubshell and with said hubshell located on the outer side of a plane which bisects the rim circumferentially,
    said spokes having enlarged inner ends fitted into said holes in said hubshell and having outer ends terminating inwardly of said holes through said rim,
    nipples extending through said holes in said rim and threaded to said outer ends of said spokes;
    the improvement comprising
    a removable supporting ring rigidly fitted into said cup-shaped inner mounting end of said hubshell covering the inner ends of said spokes and having a mounting face adjacent said plane and on the same side of said plane as said spokes, said ring being removable from said hubshell,
    whereby said rim surrounds said brake disc and said caliper is clear of the rotating spokes and hubshell.

2. A wire wheel as defined in claim 1, wherein said ring and said hubshell are connected with an interference fit.

* * * * *